United States Patent
Deshpande et al.

(10) Patent No.: US 10,621,513 B2
(45) Date of Patent: Apr. 14, 2020

(54) SYSTEM AND METHOD FOR DEPLOYING AND VERSIONING MACHINE LEARNING MODELS

(71) Applicant: Capital One Services, LLC, McLean, VA (US)

(72) Inventors: Amit Deshpande, McKinney, TX (US); Jason Hoover, Grapevine, TX (US); Geoffrey Dagley, McKinney, TX (US); Qiaochu Tang, The Colony, TX (US); Stephen Wylie, Carrollton, TX (US); Micah Price, Plano, TX (US); Sunil Vasisht, Flowermound, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/916,032

(22) Filed: Mar. 8, 2018

(65) Prior Publication Data
US 2019/0279114 A1 Sep. 12, 2019

(51) Int. Cl.
*G06N 20/00* (2019.01)
(52) U.S. Cl.
CPC .................. *G06N 20/00* (2019.01)
(58) Field of Classification Search
CPC ....... G06N 99/00; G06N 99/005; G06N 20/00
See application file for complete search history.

(56) References Cited

U.S. PATENT DOCUMENTS

| | | | | |
|---|---|---|---|---|
| 2017/0124487 | A1* | 5/2017 | Szeto | G06N 7/005 |
| 2017/0344910 | A1* | 11/2017 | Wu | G06N 20/00 |
| 2018/0129803 | A1* | 5/2018 | Levin | G06F 21/52 |

OTHER PUBLICATIONS

Matsoo, Mart. Dependency Injection in Drupal 8 Plugins. Mar. 23, 2017. retrieved from [https://chromatichq.com/blog/dependency-injection-drupal-8-plugins]. retrieved on [Jun. 12, 2018].*
Matsoo, Mart. Dependency Injection in Drupal 8 Plugins. Mar. 23, 2017. retrieved from [https://chromatichq.com/blog/dependency-injection-drupal-8-plugins]. retrieved on [Jun. 12, 2018]. (Year: 2017).*
Crankshaw, Daniel, et al. "Clipper: A low-latency online prediction serving system." 14th {USENIX} Symposium on Networked Systems Design and Implementation ({NSDI} 17). 2017. (Year: 2017).*

* cited by examiner

*Primary Examiner* — Eric Nilsson
(74) *Attorney, Agent, or Firm* — DLA Piper LLP (US)

(57) ABSTRACT

Embodiments disclosed herein generally relate to a method and system for generating a container image. A computing system receives a request from a remote computer to provision a container comprising a machine learning model. The computing system generates a first API accessible by the remote computer. The computing system receives one or more parameters for the container via the API. The one or more parameters include a machine learning model type. The computing system retrieves from a library of a plurality of machine learning models a machine learning model corresponding to a type of model specified in the one or more parameters. The computing system generates a container image that includes the machine learning model. The computing system provisions a container based on the container image.

20 Claims, 5 Drawing Sheets

SYSTEM AND METHOD FOR DEPLOYING AND VERSIONING MACHINE LEARNING MODELS

BACKGROUND

The present disclosure generally relates to a method and a system for generating a container image.

As computer technology increases, machine learning capabilities have become increasingly more important to businesses leveraging machine learning models for predictive analysis. Machine learning models include one or more machine learning algorithms that may be continuously trained with one or more training sets. The training process for the machine learning model continues until a desired accuracy level is achieved. Once the machine learning model is trained, businesses are able to input sets of data for predictive analysis.

SUMMARY

Embodiments disclosed herein generally relate to a method and system for generating a container image. In one embodiment, a method is disclosed herein. A computing system receives a request from a remote computer to provision a container comprising a machine learning model. The computing system generates a first application programming interface (API), accessible by the remote computer via an application executing on the remote computer. The computing system receives one or more parameters for the container via the first API. The one or more parameters include a machine learning model type. The computing system retrieves from a library of a plurality of machine learning models a machine learning model corresponding to a type of model specified in the one or more parameters. The computing system generates a container image that includes the machine learning model. The computing system provisions a container based on the container image.

In some embodiments, the one or more parameters further include a location of a file to be analyzed.

In some embodiments, generating the container image that includes the machine learning model includes the computing system generating the container image that includes the machine learning model and the file.

In some embodiments, the computing system further locates the file to be analyzed. The computing system further inputs the file to the machine learning model executing on the container. The computing system further analyzes the file using the machine learning model. The computing system generates a second API accessible to the remote computer to provide results of the analysis.

In some embodiments, each of the one or more parameters is directed to a dependency in a plugin.

In some embodiments, generating a container image that includes that machine learning model includes the computing system injecting the machine learning model as a dependency into the plugin.

In some embodiments, the computing system further identifies an increase in requests for the machine learning model and scales up a number of containers that includes the container image.

In another embodiment, a method is disclosed herein. A computing system generates a first machine learning model of a first type. The computing system stores the first machine learning model in the library. The computing system generates a second machine learning model of a second type. The computing system stores the second machine learning model in the library. For each machine learning model, the computing system generates a plugin specific to the respective machine learning model. The plugin includes one or more dependencies. The plugin, when executed with the one or more dependencies, generates a container image. The computing system receives an application programming interface (API) call to provision a container that includes one of the first machine learning model or the second machine learning model. The computing system receives one or more parameters via the API call. Each parameter corresponds to a dependency of the one or more dependencies. The computing system retrieves from the library the machine learning model corresponding to a received machine learning model type parameter. The computing system generates the container image by executing the plugin that includes the machine learning model type.

In some embodiments, the computing system further provisions a container based on the container image, and generates an API accessible by a remote computer to provide the results of the analysis.

In some embodiments the computing system further identifies an increase in requests for the machine learning model during a first time period. The computing system further increases a number of containers that includes the container image.

In some embodiments, the computing system further identifies a decrease in requests for the machine learning model during a second time period. The computing system further decreases a number of containers that includes the container image.

In some embodiments the computing system generates a second API accessible by the remote computer. The second API is configured to allow input of one or more files to be analyzed using the machine learning model.

In some embodiments, receiving the one or more parameters via the API includes the computing system receiving a location of a file to be analyzed with the machine learning model.

In some embodiments, generating the container image by executing the plugin includes the computing system retrieving the file, and executing the plugin that includes that machine learning model type and the file.

In some embodiments, the computing system further receives at least one of a first parameter corresponding to an accuracy level of the machine learning model, a second parameter corresponding to an output of the machine learning model, a third parameter corresponding to weights of the machine learning model, and a fourth parameter corresponding to inputs for the machine learning model.

In some embodiments, generating the container image by executing the plugin includes the computing system executing the plugin that includes the machine learning model type, the file, and at least one of the first parameter, the second parameter, the third parameter, and the fourth parameter.

In another embodiment, a system is disclosed herein. The system includes a processor and a memory. The memory has programming instructions stored thereon, which, when executed by the processor, performs an operation. The operation includes generating a first application programming interface (API) that includes one or more fields. Each field is configured to receive a parameter. The operation includes receiving one or more parameters via the API. The one or more parameters include a machine learning model type. The operation includes retrieving a machine learning model that corresponds to a type of model specified in the one or more parameters. The operation includes generating a container image that includes the machine learning model type. The operation includes provisioning a container based on the container image. The operation analyzes the file using the machine learning model. The operation generates a second API to provide results of the analysis.

In some embodiments, receiving one or more parameters via the first API includes the operation receiving a location of the file to be analyzed.

In some embodiments, the operation further includes identifying an increase in requests for the machine learning model. The operation further includes increasing a number of containers that include the container image.

In some embodiments, the operation further includes generating a third API accessible by a remote computer. The third API is configured to allow input of one or more files to by analyzed using the machine learning model.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure generally relates to a method and a system for generating a container image, according to one embodiment. One or more techniques disclosed herein relate to the generation of a container image having a machine learning model. Thus, when a container is subsequently provisioned using the container image, an end-user may have access to a machine learning model for analysis.

One or more techniques disclosed herein provide a streamlined approach to generating containers having a machine learning model executing thereon. The techniques disclosed herein allow end users to quickly prepare a container image and use the container image to provision one or more containers. Such process eliminates the need for manually copying a machine learning model file, and related executables, to generate containers and initiate the application programming interface (API) to access the container. Furthermore, in conventional systems, provisioning new containers, or new container hosts, may be difficult due to the highly regulated and controlled production environments. Production environments may include many restrictions and requirements that were put into place for purposes of accountability and traceability. Accordingly, it is prudent for end users of conventional systems to be privy to the security rules set into place, possibly by an organization or governing body, for provisioning of containers.

The approach discussed herein, on the other hand, is directed to providing a customized container (or virtual machine) having a machine learning model pre-loaded therein. For example, an end user (or an application executed by an end user) may define one or more parameters for a machine learning model and pass that information to a backend computing environment. Based on the one or more parameters received by the user, backend computing environment may generate a container image. Accordingly, when backend computing environment provisions a container with container image, container will include the customized machine learning model.

Figure 1:
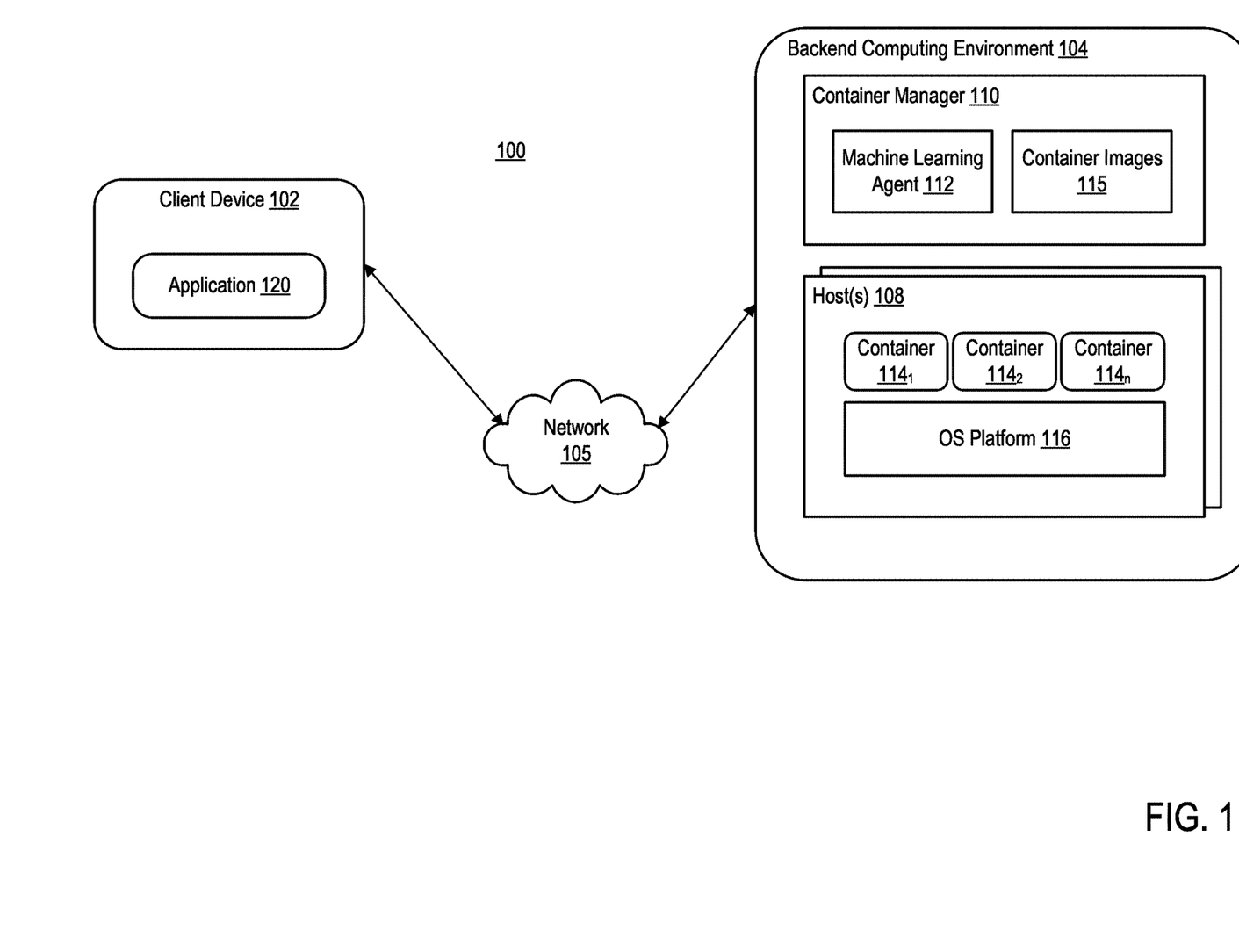
FIG. 1 is a block diagram illustrating a computing environment, according to one embodiment.

FIG. 1 is a block diagram illustrating a computing environment 100, according to one embodiment. Computing environment 100 may include a client device 102 and backend computing environment 104 communicating over network 105. Client device 102 may be operated by user 101. For example, client device 102 may be a mobile device, a tablet, a desktop computer, or any computing system having the capabilities described herein. Client device 102 may execute one or more applications 120. In some embodiments, application 120 may be a web browser based application. Application 120 may provide one or more functionalities of backend computing environment 104.

Backend computing environment 104 may support one or more hosts 108. In one embodiment, host 108 may be a virtualized host, such as a virtual machine (VM) executing on a physical host. In some embodiments, host 108 may be a physical computer, such as a desktop computer, a mobile device or the like. Each host 108 can include one or more containers 114 (generally "containers $114_i$") and an operating system platform 116 ("OS platform 116").

Backend computing environment 104 may further include a container manager 110. Container manager 110 may provide an application programming interface (API) endpoint for host 108. For example, container manager 110 may be accessible to users via a REST (representational state transfer) API (application programming interface) or any other client-server communication protocol. Client device 102 may communicate with container manager 110 to build, run, stop, update, and delete containers 114. Container manager 110 may receive provisioning requests submitted (e.g., via REST API calls) and provision a container 114 based on the provisioning requests.

Container manager 110 may be comprised of one or more software modules. The one or more software modules may include collections of instructions stored on a media (e.g., memory of one or more computing systems of backend computing environment 104) that represent a series of machine instructions (e.g., program code) that implements one or more algorithmic steps. Such machine instructions may be the actual computer code the processor of one or more computing systems on backend computing environment 104 interprets to implement the instructions, or, alternatively, may be a higher level coding of the instructions that is interpreted to obtain the actual computer code. The one or more software modules may also include one or more hardware components. One or more aspects of an example algorithm may be performed by the hardware components (e.g., circuitry) itself, rather as a result of an instruction.

Container manager 110 may include a machine learning model agent 112 and container images 115. Machine learning model agent 112 may be configured to generate one or more container images 115 for containers 114. Container image 115 may be referred to as a template to create one or more containers 114. Container image 115 may include one or more files related to container 114, such as provisioning information. In some examples, each container image 115 may further include one or more machine learning models. For example, a machine learning model included in each container image 115 may be a pre-trained machine learning model that is configured to receive one or more files for analysis from user. By deploying a container having container image 115 that includes a machine learning model, an end user, via client device 102, may have access to preconfigured machine learning models. Such process of provisioning a container (e.g., container 114) having container image 115 that includes a machine learning model eliminates the need for end users (e.g., client device 102) having to configure a machine learning model. Rather, container manager 110 provides end users with access to a pre-trained machine learning model for efficient analysis of one or more client files.

Figure 2:
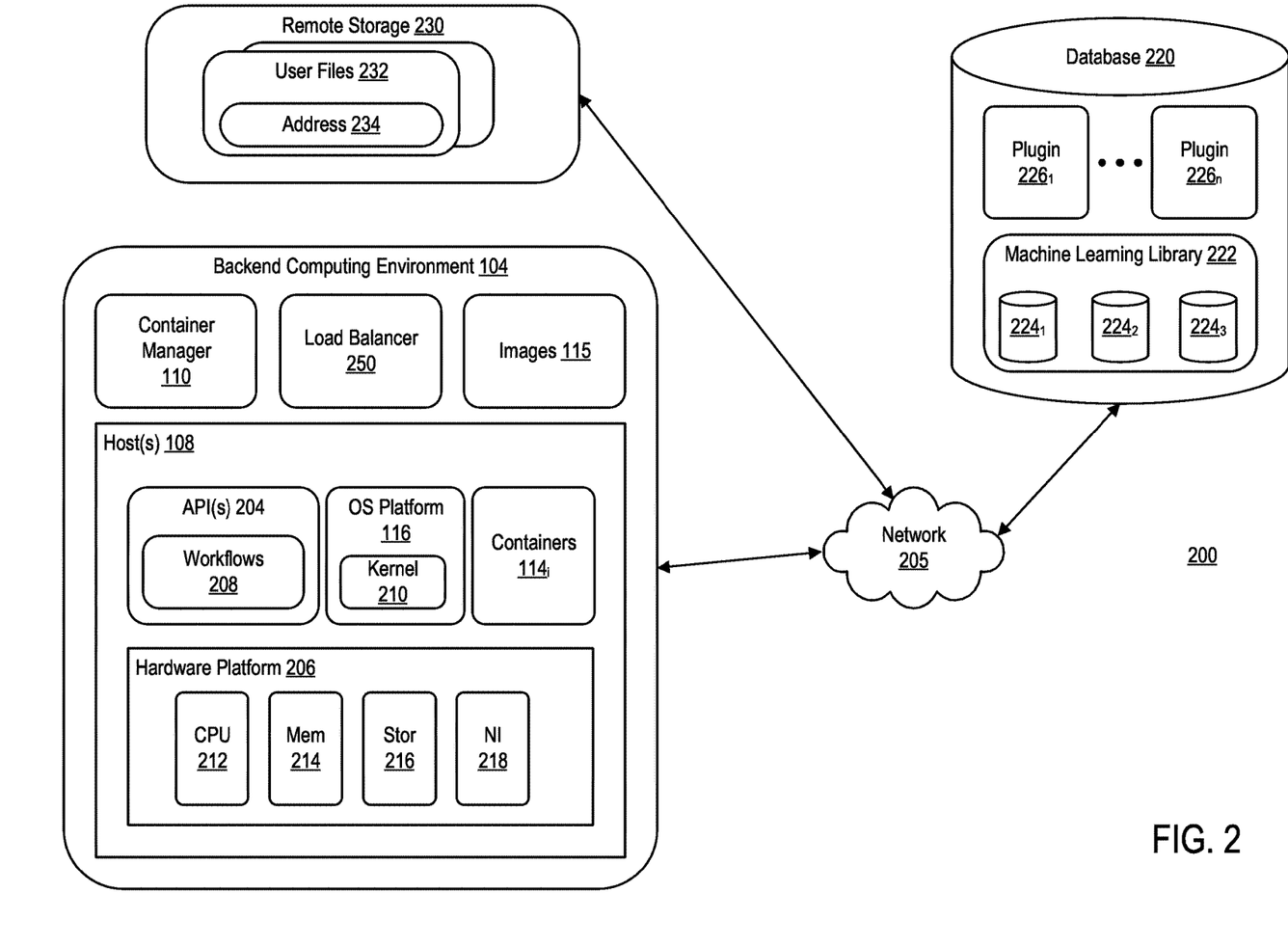
FIG. 2 is a block diagram illustrating components of the computing environment of FIG. 1 in more detail, according to one embodiment.

FIG. 2 is a block diagram 200 illustrating one or more components from computing environment 100 in more detail, according to one embodiment. Backend computing environment 104 may include a hardware platform 206. Hardware platform 206 may be hosted via one or more hosts 108. As shown, hardware platform 206 can include one or more processors (CPUs) 212, system memory 214, storage 216, and network interface 218. In some embodiments, hardware platform 206 may further include one or more I/O device(s) (not shown).

Processor 212 may retrieve and execute program codes stored in memory 214, as well as store and retrieve application data. Processor 212 is included to be representative of a single processor, multiple processors, a single processor having multiple processing cores, and the like. Network interface 218 may be any type of network communications allowing backend computing environment 104 to communicate externally via network 205. For example, network interface 218 may enable one or most hosts 108 to communicate with another device (e.g., client device 102) via network 205. Network interface 218 may be one or more adapters, also referred to as network interface card (NIC).

Storage 216 may be, for example, a disk storage drive. Although shown as a single unit, storage 216 may be a combination of fixed and/or removable storage devices, such as fixed disk drives, removable memory cards, optical storage, network attached storage (NAS), storage area network (SAN), and the like. Memory 214 may include information, such as programming instructions, that may be stored and retrieved. Memory 214 may include, for example, one or more random access memory (RAM) modules.

Backend computing environment 104 may further include an operating system platform 116. Operating system platform 116 may provide a virtualization layer that allows one or more containers 114 to share resources of an operating system (OS). As such, the processes carried out by containers 114 may be isolated in the underlying operating system. Operating system platform 116 may include kernel 210. Each container 114 runs on top of kernel 210, which enables sharing of operating system resources of backend computing environment 104 by containers 114. Containers 114 may implement OS-level virtualization, wherein an abstraction layer is provided on top of kernel 210 of an operating system of backend computing environment 104 (e.g., of one or more hosts 108). The abstraction layer may support multiple containers 114, with each container 114 including an application and its dependencies. Each container 114 may run as an isolated process on a host operating system and share kernel 210 with other containers 114. For example, each container 114, may share kernel 210. Each container 114 may rely on the functionality of kernel 210 to make use of resource isolation (CPU, memory, network, storage, etc.).

Backend computing environment 104 may further include a set of APIs 204 having one or more workflows 208. Workflow 208 is a series of actions and decisions to be executed in connection with container 114. Each workflow 208 may include various phases for managing container 114. For example, workflow 208 may include an allocation phase and APIs 204 may include a given subset of APIs corresponding to the allocation phase.

As recited above, container manager 110 may be configured to generate a container image 115 for use in provisioning a container 114. Container image 115 may include at least a machine learning model such that the machine learning model is accessible by client device 102 when container manager 110 provisions container 114 having container image 115. Generally, the type of machine learning model included in container image 115 may be designated by a user or application running on client device in one or more parameters included in the API call from client device 102. For example, client device 102 may request a machine learning model from among an example selection of a decision tree learning model, association rule learning model, artificial neural network model, deep learning model, inductive logic programming model, support vector machine model, clustering mode, Bayesian network model, reinforcement learning model, representational learning model, similarity and metric learning model, rule based machine learning model, other supervised or unsupervised machine learning models, and the like. In essence, container manager 110 may provide a machine learning model agnostic functionality that allows client device 102 to request a particular type of machine learning model that container manager 110 may leverage to provision a container 114 having the particular machine learning model type pre-loaded therein.

Backend computing environment 104 may be in communication with database 220 via network 205. Database 220 may include one or more plugins 226 (generally, "plugin 226,") and a machine learning library 222. Backend computing environment 104 leverages information in database 220 to provide machine learning model agnostic functionality to client device 102.

Container manager 110 may generate one or more plugins 226 for use in generating one or more container images 115. In some embodiments, each of the one or more plugins 226 may correspond to a respective machine learning type. In other embodiments, each of the one or more plugins 226 may be machine learning type agnostic. Container manager 110 may pre-generate each plugin 226 such that there are core functionalities across each plugin 226. Container manager 110 may define one or more dependencies for plugin 226 such that, when executed, plugin 226 along with one or more dependencies may generate a container image 115 corresponding to a request by client device 102. For example, container manager 110 may notify client device 102 that an API is available, such that client device 102 may pass one or more parameters to container manager 110 for use in generating container image 115.

Each of the one or more parameters corresponds to each of the one or more dependencies pre-defined by container manager 110. In operation, client device 102 may transmit an API call to backend computing environment 104 for the provisioning of one or more containers 114 having a machine learning model contained therein. Client device 102 may specify at least a machine learning model type. Based on the information received, container manager 110 may identify a plugin 226 corresponding to the machine learning model type 226 in database 220. Container manager 110 may further identify a machine learning model 224 in machine learning model library 222. Container manager 110 may then execute identified plugin 226 with retrieved machine learning model 224 to generate a customized container image 115 based on the API call.

In some embodiments, the one or more parameters in the request from client device 102 may further include information directed to one or more files to be analyzed by machine learning model in container image 115. For example, the one or more parameters in the request may include location information for the one or more files. In some embodiments, backend computing environment 104 may further be in communication with remote storage 230 via network 205. Remote storage 230 may be a cloud storage application hosted by one or more computing systems. Remote storage 230 may include one or more client files 232 corresponding to client device 102. Each file 232 may include an address 234 corresponding thereto. Accordingly, client device 102 may include address 234 corresponding to each file 232 to be analyzed by machine learning model. Accordingly, in embodiments in which location information for the one or more files to be analyzed is included in the one or more parameters passed by client device 102, container manager 110 may execute an identified plugin 226 with both retrieved machine learning model 224 and user file 232 based on location information of client file 232. Accordingly, when container manager 110 provisions container 114 using container image 115, container manager 110 may generate an API, accessible to client device 102, such that client device 102 may access results of the machine learning model analysis.

Client device 102 via application 120 may not access API on container 114 directly. In some embodiments, upon creation of container 114, container manager 110 may generate a load balancer 250, related to container image 115. Load balancer 250 may notify client device 102 and/or application 120 that an API is available for accessing machine learning model 224 in container 114. Accordingly, load balancer 250 may be used to make API requests on any given container 114 generated using container image 115.

Figure 3:
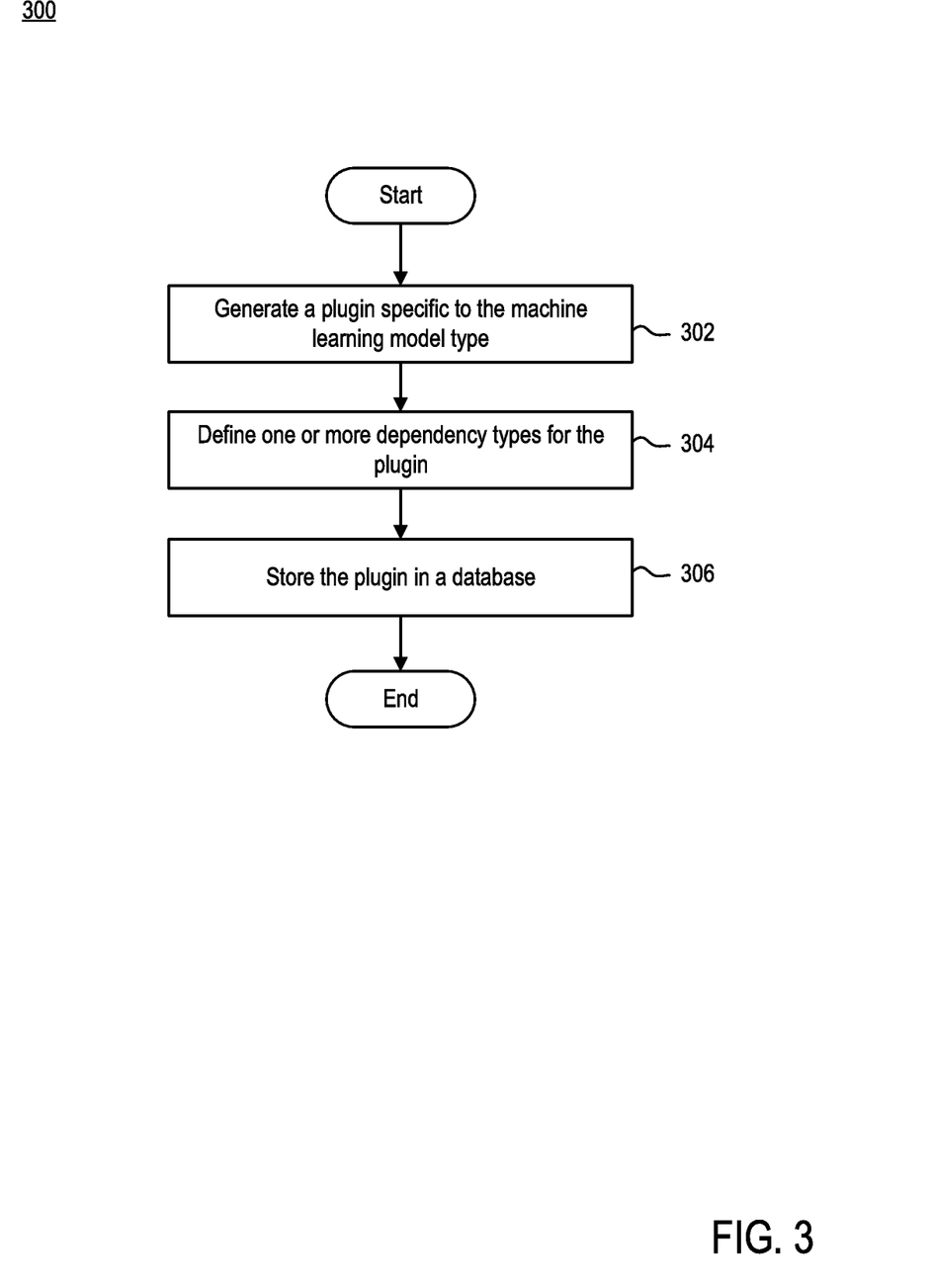
FIG. 3 is a flow diagram illustrating a method of generating a plugin for use in generating a container image, according to one embodiment.

FIG. 3 is a flow diagram illustrating a method 300 of generating a machine learning model plugin (e.g., plugin 226), according to one embodiment. In some embodiments, each plugin 226 may be pre-generated and stored in database 220. In some embodiments, plugins 226 may be generated on an on-demand basis.

Method 300 begins at step 302. At step 302, container manager 110 generates one or more core functionalities of plugin 226. For example, container manager 110 may generate one or more functionalities that may be common across all plugins 226 stored in database 220. In some embodiments, the one or more core functionalities may include one or more steps in container image 115 generation process such as gathering an operating system underlying each container 114, one or more applications, configuration files, binaries, and the like.

At step 304, container manager 110 defines one or more dependency types for plugin 226. By generating one or more dependency types for plugin 226, container manager 110 allows client device 102 to request access to a customized machine learning model. For example, one or more dependency types may include a machine learning model type (e.g., decision tree learning model, association rule learning model, artificial neural network model, deep learning model, inductive logic programming model, support vector machine model, clustering mode, Bayesian network model, reinforcement learning model, representational learning model, similarity and metric learning model, rule based machine learning model, and the like), one or more weights for the machine learning model algorithms, one or more preferences for the output from the machine learning model, a location of one or more files to be analyzed by the machine learning model, an accuracy level of the machine learning model, and the like. In operation, container manager 110 may inject one or more dependencies into plugin 226. For example, container manager 110 may inject one or more dependencies into plugin 226 with the one or more functionalities common across all plugins 226. Accordingly, in operation, container manager 110 may execute one or more functionalities common across all plugins, along with the one or more dependencies, to generate container image 115.

At step 306, container manager 110 stores plugin 226 in database 220. When requested, container manager 110 may retrieve plugin 226 from database 220 to generate container image 115.

Figure 4:
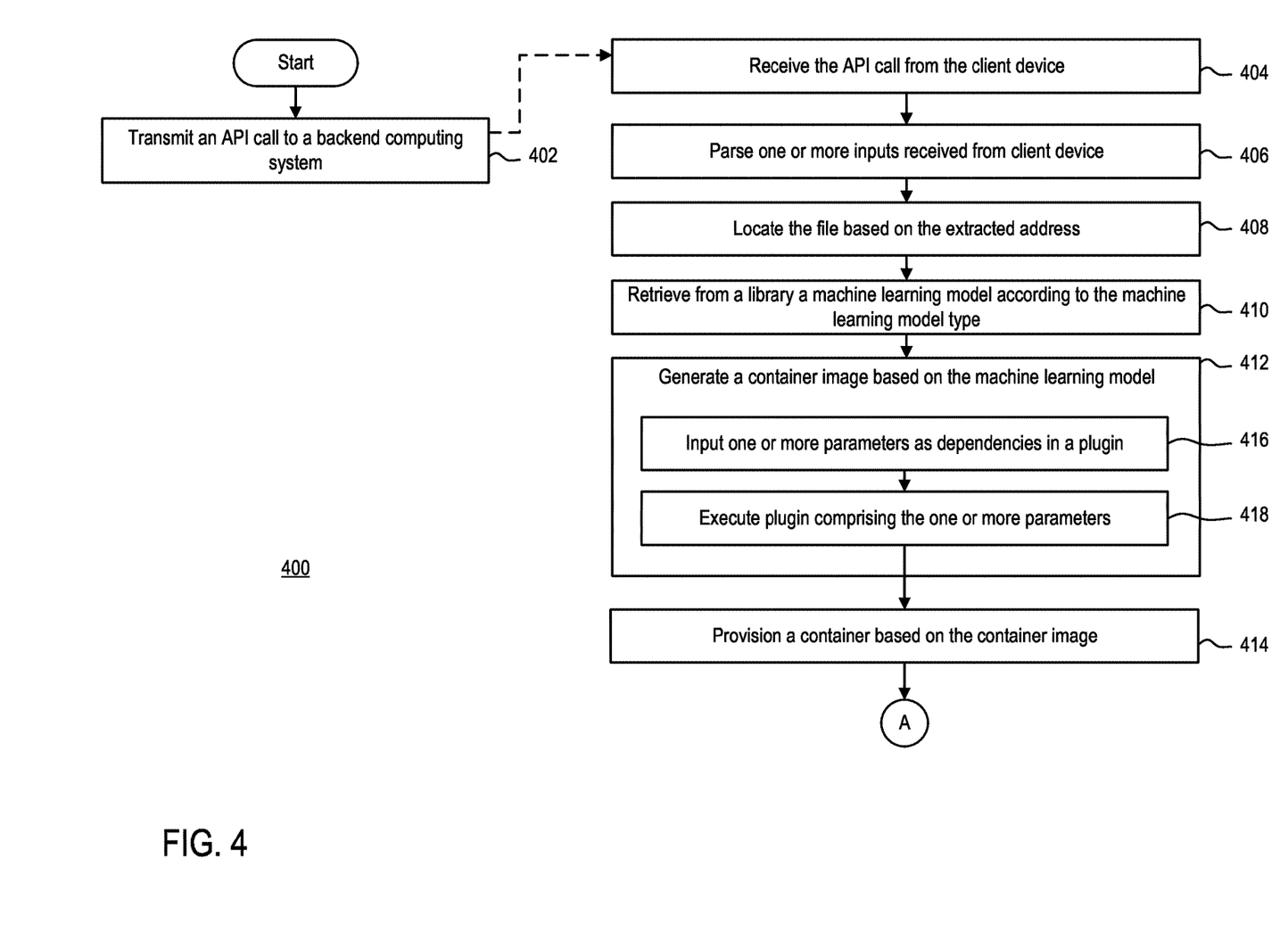
FIG. 4 is a flow diagram illustrating a method of generating a container having a container image, according to one embodiment.

FIG. 4 is a flow diagram illustrating a method 400 of provisioning a container, according to one embodiment. Although method 400 is discussed in conjunction with the computing environments of FIGS. 1 and 2, those skilled in the art can readily understand that method 400 may be practiced using any suitable computing environment.

Method 400 begins at step 402. At step 402, client device 102 may transmit a provisioning request to backend computing environment 104. Generally, container manager 110 may be accessible to users via a REST API. Accordingly, client device 102 may submit a provisioning request via REST API calls to container manager 110 for the provisioning of one or more containers 114. Included in the REST API calls may be one or more parameters defined by client device 102. One or more parameters may be directed to customized settings for the container requested by client device 102. In some embodiments, the one or more parameters includes at least a machine learning model type corresponding to the machine learning model requested for analysis. In some embodiments, the one or more parameters may further include a file to be analyzed using machine learning model analysis. In some embodiments, the one or more parameters may further include one or more outputs desired by the machine learning model, an accuracy of the machine learning model, one or more weights for the machine learning model, a file location of the file to be analyzed by the machine learning model, and the like. Each of the one or more parameters may correspond to a dependency defined by the container manager 110 for use in generating a container image 115. For example, each parameter may correspond to a dependency defined in a plugin generated by container manager 110.

At step 404, backend computing environment 104 may receive the API call from client device 102. For example, container manager 110 may receive the API call from client device 102. The API call may be indicative of client device 102 requesting the provisioning of a container (e.g., container 114) hosting a machine learning model.

At step 406, backend computing environment 104 may parse one or more inputs received from client device 102. For example, machine learning model agent 112 of container manager 110 may parse one or more inputs received from client device 102 for use in generating container image 115. In some embodiments, machine learning model agent 112 may parse the one or more inputs to identify at least a machine learning model type specified by client device 102. In some embodiments, machine learning model agent 112 may parse the one or more inputs to further identify a file for use with a machine learning type model. Such inputs may be subsequently used in generating container image 115 for the requested container 114. For example, the machine learning model type may be used as a dependency in the plugin that was pre-generated for use in generating a respective container image 115.

At step 408, container manager 110 may locate a file to be analyzed based on the one or more inputs. For example, machine learning model agent 112 may extract an address of a file to be analyzed from the one or more inputs defined by client device 102. In some embodiments, the file may be remotely hosted on a cloud computing environment (e.g., remote storage 230). Machine learning model agent 112 may locate the file to be analyzed based on the received address. For example, each file 232 hosted on cloud computing environment may include a unique address 234 identifying each respective file 232.

At step 410, container manager 110 may retrieve a machine learning model based on the received machine learning model type included in the one or more parameters. For example, container manager 110 may parse the one or more inputs to identify a machine learning model type specified by client device 102. Machine learning model type may be one of decision tree learning model, association rule learning model, artificial neural network model, deep learning model, inductive logic programming model, support vector machine model, clustering mode, Bayesian network model, reinforcement learning model, representational learning model, similarity and metric learning model, rule based machine learning model, or any suitable machine learning model type. Based on the identified machine learning model type passed to container manager 110, container manager 110 may query database 220 to retrieve a machine learning model corresponding to the machine learning model type. For example, container manager 110 may query machine learning model library 222 in database 220.

At step 412, container manager 110 may generate a container image (e.g., container image 115). For example, machine learning model agent 112 may generate container image 115 based at least on the retrieved machine learning model 224 using plugin 226. In some embodiments, machine learning model agent 112 may generate container image 115 based at least on the retrieved machine learning model and the located file 232. In some embodiments, step 412 includes sub-steps 416 and 418.

At sub-step 416, machine learning model agent 112 may input one or more parameters received from client device 102 into plugin 226. Each of the one or more parameters may correspond to a dependency type that is pre-defined in plugin 226. For example, machine learning model agent 112 may input at least a machine learning model (according to the designated machine learning model type). In another example, machine learning model agent 112 may further input a file (according to the location of the file to be analyzed). In some embodiments, machine learning model agent 112 may further input one or more parameters directed to one or more outputs desired by the machine learning model, an accuracy of the machine learning model, one or more weights for the machine learning model, and the like.

At sub-step 418, machine learning model agent 112 may execute plugin 226. For example, machine learning model agent 112 may execute plugin 226 along with the one or more dependencies contained therein. Accordingly, machine learning model agent 112 may execute plugin 226 such that container image 115 includes machine learning model 224. In embodiments in which plugin 226 is executed without file 232, container manager 110 may input file 232 to machine learning model after container manger 110 provisions a container 114 using container image 115. In some embodiments, the machine learning model agent 226 may execute plugin 226 such that container image 115 includes at least both the machine learning model 224 and file 232.

In some embodiments, method 400 may further include step 414. At step 414, container manager 110 provisions container 114. For example, container manager 110 provisions container 114 using container image 115 having machine learning model 224. In some embodiments, container manager 110 may input file 232 to machine learning model 224 executing on container 114. In some embodiments, container manager 110 provisions container 114 using container image 115 having machine learning model 224 and file 232. In some embodiments, container manager 110 may notify client device 102 that an API now exists for access to container 114 executing on one or more hosts 108. For example, container manager 110 may generate an API that present results of the machine learning model analysis of file 232 to client device 102, which may be accessible via an application (e.g., application 120) executing on client device 102. Client device 102 via application 120 may not access API on container 114 directly. In some embodiments, upon creation of container 114, container manager 110 may generate a load balancer 250, related to container image 115. Load balancer 250 may notify client device 102 and/or application 120 that an API is available for accessing machine learning model 224 in container 114. Accordingly, load balancer 250 may be used to make API requests on any given container 114 generated using container image 115.

Still further, in some embodiments, container manager 110 may generate a second API, accessible to client device 102 via application 120. The second API may allow client device 102 to input one or more additional files to be analyzed via machine learning model 224. Accordingly, container manager 110 may make accessible subsequent APIs, such that client device 102 may access results of the machine learning model analyses of the one or more additional files. For example, to submit new files (or data) for classification/prediction, client device may make an HTTP POST request to the second API. The second API may return a key (e.g., universal unique identifier (UUID)), to use for accessing the results in an asynchronous manner. The second API may accept this key as a parameter to an HTTP GET request, in which the second API would return the result or an error relating to a classification failure or not finished yet. In another example, client device 102 may make an HTTP POST request to the second API with new files/data. The second API may return the classification/prediction in its response data. Such methodology eliminates the need for client device to call any additional APIs.

Although method 400 discusses the provisioning of one or more containers 114 having trained machine learning models loaded thereon, in some embodiments, client device 102 may request an untrained machine learning model. In this embodiment, container manager 110 would generate a container image 115 having an untrained machine learning model. Accordingly, container manager 110 may provision a container 114 using container image 115 such that the untrained machine learning model is loaded thereon. When provided access to the container 114 having the untrained machine learning model via an API, client device 102 may input one or more training sets to train machine learning model. Subsequently, once trained, client device 102 may further input one or more files to be analyzed by the machine learning model via the API.

Figure 5A:
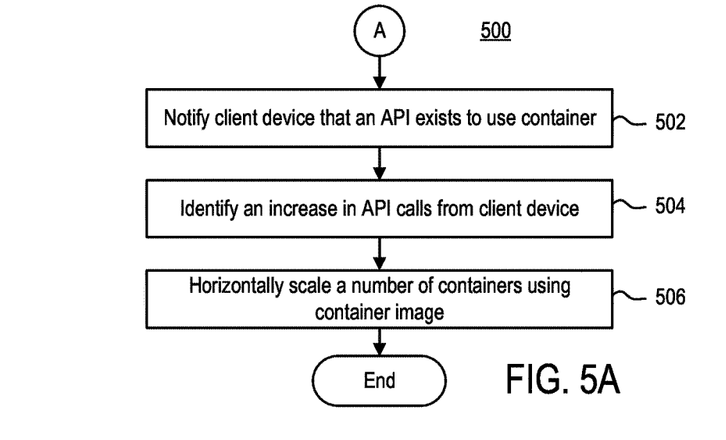
FIG. 5A is a flow diagram illustrating one or more optional steps of the method of FIG. 4, according to one embodiment.

FIG. 5A is a flow diagram illustrating a method 500 of generating a container, according to one embodiment. The one or more operations set forth in method 500 may be additional operations that may be performed by container manager 110 in generating container image 115 and provisioning container 114.

Method 500 begins at step 502. At step 502, container manager 110 may notify client device 102 that an API now exists to use container 114. For example, container manager 110 may make accessible an API via application 120 executing on client device 102, such that client device 102 may access functionality of container 114 executing on one or more hosts 108 in backend computing environment 102. Client device 102 via application 120 may not access API on container 114 directly. In some embodiments, upon creation of container 114, container manager 110 may generate a load balancer 250, related to container image 115. Load balancer 250 may notify client device 102 and/or application 120 that an API is available for accessing machine learning model 224 in container 114. Accordingly, load balancer 250 may be used to make API requests on any given container 114 generated using container image 115.

At step 504, container manager 110 may identify an increase in requests from client device 102. For example, container manager 110 may identify an increase in requests for classifying additional input files. In another example, container manager 110 may identify an increase in requests for the results of analyses using the machine learning model (or various pieces of the results). An increase in traffic may slow down any machine learning model processes executing on container 114 having container image 115.

At step 506, container manager 110 may increase a number of containers 114 using container image 115 based on this identified increase in requests from client. Increasing the number of containers 114 executing on one or more hosts 108 in backend computing environment 104 may increase the number of resources accessible to the machine learning algorithm executing thereon.

Figure 5B:
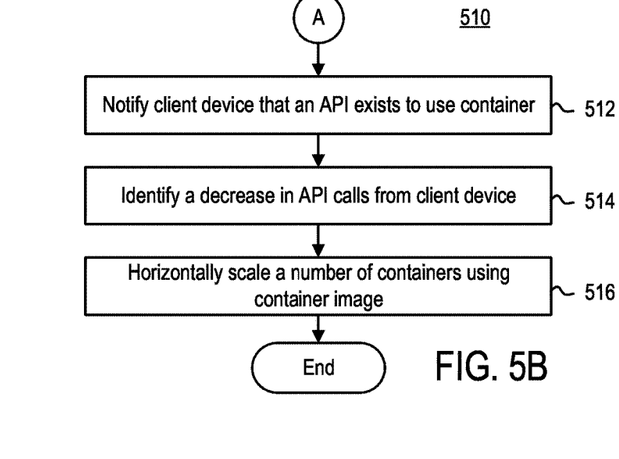
FIG. 5B is a flow diagram illustrating one or more optional steps of the method of FIG. 4, according to one embodiment.

FIG. 5B is a flow diagram illustrating a method 510 of generating a container, according to one embodiment. The one or more operations set forth in method 510 may be additional operations that may be performed by container manager 110 in generating container image 115 and provisioning container 114. Client device 102 via application 120 may not access API on container 114 directly. In some embodiments, upon creation of container 114, container manager 110 may generate a load balancer 250, related to container image 115. Load balancer 250 may notify client device 102 and/or application 120 that an API is available for accessing machine learning model 224 in container 114. Accordingly, load balancer 250 may be used to make API requests on any given container 114 generated using container image 115.

Method 510 begins at step 512. At step 512, container manager 110 may notify client device 102 that an API now exists to use container 114. For example, container manager 110 may make accessible an API via application 120 executing on client device 102, such that client device 102 may access functionality of container 114 executing on one or more hosts 108 in backend computing environment 102.

At step 514, container manager 110 may identify a decrease in requests from client device 102. For example, container manger 110 may identify a decrease in requests for classifying additional input files. In some embodiments, this decrease in request for classifying additional input files may be following an increase in containers 114. In another example, container manager 110 may identify a decrease in requests for the results of analyses using the machine learning model (or various pieces of the results). Accordingly, the decrease in traffic may correspond to too many resources being allocated containers 114 executing the machine learning model . . . .

At step 516, container manager 110 may decrease a number of containers 114 generated using image 115 based on this identified decrease in requests from client. In some embodiments, container manager 110 may shut down one or more containers 114. In some embodiments, container manager 110 may temporarily halt operations performed on one or more containers 114.

Figure 5C:
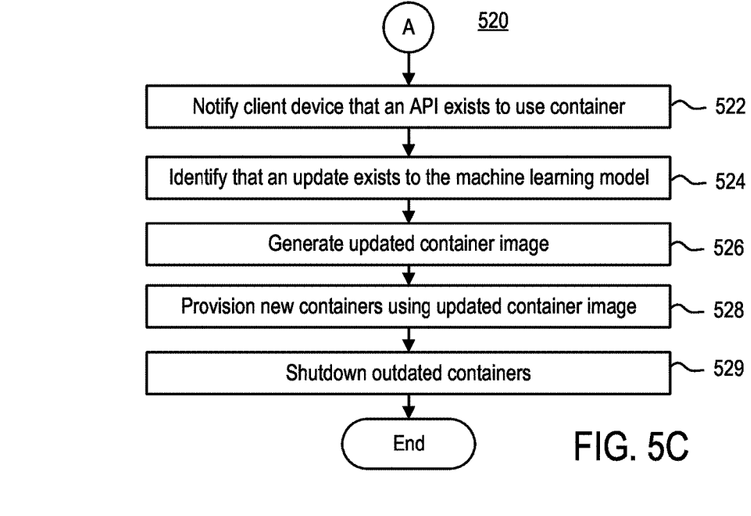
FIG. 5C is a flow diagram illustrating one or more optional steps of the method of FIG. 4, according to one embodiment.

FIG. 5C is a flow diagram illustrating a method 520 of generating a container, according to one embodiment. The one or more operations set forth in method 520 may be additional operations that may be performed by container manager 110 in generating container image 115 and provisioning container 114.

Method 520 begins at step 522. At step 522, container manager 110 may notify client device 102 that an API now exists to use container 114. For example, container manager 110 may make accessible an API via application 120 executing on client device 102, such that client device 102 may access functionality of container 114 executing on one or more hosts 108 in backend computing environment 102. Client device 102 via application 120 may not access API on container 114 directly. In some embodiments, upon creation of container 114, container manager 110 may generate a load balancer 250, related to container image 115. Load balancer 250 may notify client device 102 and/or application 120 that an API is available for accessing machine learning model 224 in container 114. Accordingly, load balancer 250 may be used to make API requests on any given container 114 generated using container image 115.

At step 524, container manager 110 may identify an update to machine learning model 224 used to generate container image 115. For example, machine learning library 222 may be updated with a new version of machine learning model 224 used in plugin 226 to generate container image 115.

At step 526, container manager 110 may update the machine learning model in container image 115. For example, container manager 110 may re-generate container image 115 using the updated machine learning model. In some embodiments, generating container image 115 using the updated machine learning model is performed while the current containers 114 remain running. In some embodiments, generating container image 115 using the updated machine learning model is performed while the current containers 114 are shut down.

At step 528, container manager 110 may provision containers 114 using updated container image 115. Accordingly, container 114 may have updated machine learning model loaded thereon when created.

At step 529, container manager 110 may shut down containers 114 having outdated container image 115. In some embodiments, container manager 110 may shut down container 114 having outdated container image 115 before access to updated containers 114 is provided via an updated API. In some embodiments, container manager 110 may provide access to updated containers 114 while outdated containers 114 remain provisioned.

Figure 5D:
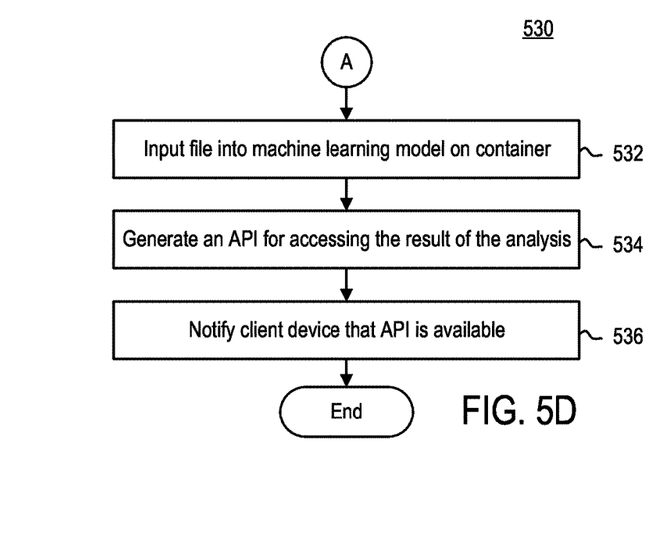
FIG. 5D is a flow diagram illustrating one or more optional steps of the method of FIG. 4, according to one embodiment.

FIG. 5D is a flow diagram illustrating a method 530 of generating a container, according to one embodiment. The one or more operations set forth in method 530 may be additional operations that may be performed by container manager 110 in generating container image 115 and provisioning container 114.

Method 530 begins at step 532. At step 532, container manager 110 may input file designated by client device 102 into machine learning model 224 in container image 115. For example, file 232 may be analyzed by machine learning model 224 in container 114 having container image 115.

At step 534, container manager 110 may generate an API for accessing the results of the analysis. For example, container manager 110 may generate a REST API to be accessed via application 120. For example, via the API, client device 102 may access the results from the machine learning model analysis performed on container 114 executing on one or more hosts 108.

At step 536, container manager 110 may notify client device 102 that an API now exists to access results of the machine learning model analysis. For example, container manager 110 may make accessible an API via application 120 executing on client device 102, such that client device 102 may access results generated on container 114 executing on one or more hosts 108 in backend computing environment 102.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method, comprising:
   accessing a first pre-trained machine learning model of a first type and storing the first pre-trained machine learning model in a library;
   accessing a second pre-trained machine learning model of a second type and storing the second pre-trained machine learning model in the library;
   for each pre-trained machine learning model, generating a plugin specific to the respective pre-trained machine learning model, wherein the plugin comprises one or more dependencies, the plugin, when executed with the one or more dependencies, generates a container image;
   receiving an application programming interface (API) call to provision a container including one of the first pre-trained machine learning model or the second pre-trained machine learning model;
   receiving one or more parameters via the API call, wherein each parameter corresponds to a dependency of the one or more dependencies;
   retrieving from the library the pre-trained machine learning model corresponding to a received machine learning model type parameter; and
   generating the container image by executing the plugin comprising the retrieved pre-trained machine learning model.

2. The method of claim 1, further comprising:
   provisioning a container based on the container image; and
   generating an API accessible by a remote computer to provide results of the analysis.

3. The method of claim 2, further comprising:
   identifying an increase in requests for the retrieved pre-trained machine learning model during a first time period; and
   increasing a number of containers comprising the container image.

4. The method of claim 3, further comprising:
   identifying a decrease in requests for the retrieved pre-trained machine learning model during a second time period; and
   decreasing a number of containers comprising the container image.

5. The method of claim of claim 2, further comprising:
   generating a second API accessible by the remote computer, the second API configured to allow input of one or more files to be analyzed using the pre-trained machine learning model.

6. The method of claim 1, wherein the one or more received parameters comprises
   a location of a file to be analyzed with the retrieved pre-trained machine learning model.

7. The method of claim 6, wherein generating the container image by executing the plugin further comprises:
   retrieving the file; and
   executing the plugin comprising the retrieved pre-trained machine learning model type and the file.

8. The method of claim 6, further comprising receiving at least one of:

a first parameter corresponding to an accuracy level of the retrieved pre-trained machine learning model;

a second parameter corresponding to an output of the retrieved pre-trained machine learning model;

a third parameter corresponding to weights of the retrieved pre-trained machine learning model; or a fourth parameter corresponding to inputs for the retrieved pre-trained machine learning model.

9. The method of claim 8, wherein generating the container image by executing the plugin further comprises:

executing the plugin comprising the retrieved pre-trained machine learning model, the file, and the at least one of the first parameter, the second parameter, the third parameter, or the fourth parameter.

10. A system, comprising:

a processor; and a memory, having programming instructions stored thereon, which, when executed by the processor, performs one or more operations, comprising:

accessing a first pre-trained machine learning model of a first type and storing the first pre-trained machine learning model in a library;

accessing a second pre-trained machine learning model of a second type and storing the second pre-trained machine learning model in the library;

for each pre-trained machine learning model, generating a plugin specific to the respective pre-trained machine learning model, wherein the plugin comprises one or more dependencies, the plugin, when executed with the one or more dependencies, generates a container image;

receiving an application programming interface (API) call to provision a container including one of the first pre-trained machine learning model or the second pre-trained machine learning model;

receiving one or more parameters via the API call, wherein each parameter corresponds to a dependency of the one or more dependencies;

retrieving from the library the pre-trained machine learning model corresponding to a received machine learning model type parameter; and generating the container image by executing the plugin comprising the retrieved pre-trained machine learning model.

11. The system of claim 10, wherein the one or more operations further comprise:

provisioning a container based on the container image; and generating an API accessible by a remote computer to provide results of the analysis.

12. The system of claim 11, wherein the one or more operations further comprise:

identifying an increase in requests for the retrieved pre-trained machine learning model during a first time period; and increasing a number of containers comprising the container image.

13. The system of claim 12, wherein the one or more operations further comprise:

identifying a decrease in requests for the retrieved pre-trained machine learning model during a second time period; and decreasing a number of containers comprising the container image.

14. The system of claim 11, wherein the one or more operations further comprise:

generating a second API accessible by the remote computer, the second API configured to allow input of one or more files to be analyzed using the pre-trained machine learning model.

15. The system of claim 10, wherein the one or more received parameters comprises a location of a file to be analyzed with the retrieved pre-trained machine learning model.

16. The system of claim 15, wherein generating the container image by executing the plugin further comprises:

retrieving the file; and executing the plugin comprising the retrieved pre-trained machine learning model type and the file.

17. The system of claim 15, wherein the one or more operations further comprise receiving at least one of:

a first parameter corresponding to an accuracy level of the retrieved pre-trained machine learning model;

a second parameter corresponding to an output of the retrieved pre-trained machine learning model;

a third parameter corresponding to weights of the retrieved pre-trained machine learning model; or a fourth parameter corresponding to inputs for the retrieved pre-trained machine learning model.

18. The system of claim 17, wherein generating the container image by executing the plugin further comprises:

executing the plugin comprising the retrieved pre-trained machine learning model, the file, and the at least one of the first parameter, the second parameter, the third parameter, or the fourth parameter.

19. A non-transitory computer readable medium including one or more sequences of instructions that, when executed by the one or more processors, causes:

accessing a first pre-trained machine learning model of a first type and storing the first pre-trained machine learning model in a library;

accessing a second pre-trained machine learning model of a second type and storing the second pre-trained machine learning model in the library;

for each pre-trained machine learning model, generating a plugin specific to the respective pre-trained machine learning model, wherein the plugin comprises one or more dependencies, the plugin, when executed with the one or more dependencies, generates a container image;

receiving an application programming interface (API) call to provision a container including one of the first pre-trained machine learning model or the second pre-trained machine learning model;

receiving one or more parameters via the API call, wherein each parameter corresponds to a dependency of the one or more dependencies;

retrieving from the library the pre-trained machine learning model corresponding to a received machine learning model type parameter; and generating the container image by executing the plugin comprising the retrieved pre-trained machine learning model.

20. The non-transitory computer readable medium of claim 19, further comprising:

provisioning a container based on the container image; and generating an API accessible by a remote computer to provide results of the analysis.

* * * * *